E. E. CHAIN.
MEASURING MACHINE.
APPLICATION FILED JUNE 22, 1907.

907,126.

Patented Dec. 22, 1908.
5 SHEETS—SHEET 2.

Witnesses:
H. A. Hall
J. Murphy

Inventor:
Elmer E. Chain
by Jas. H. Churchill
Atty.

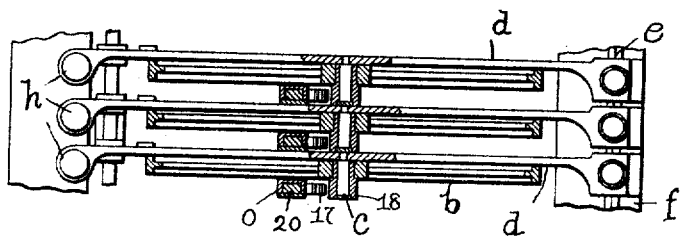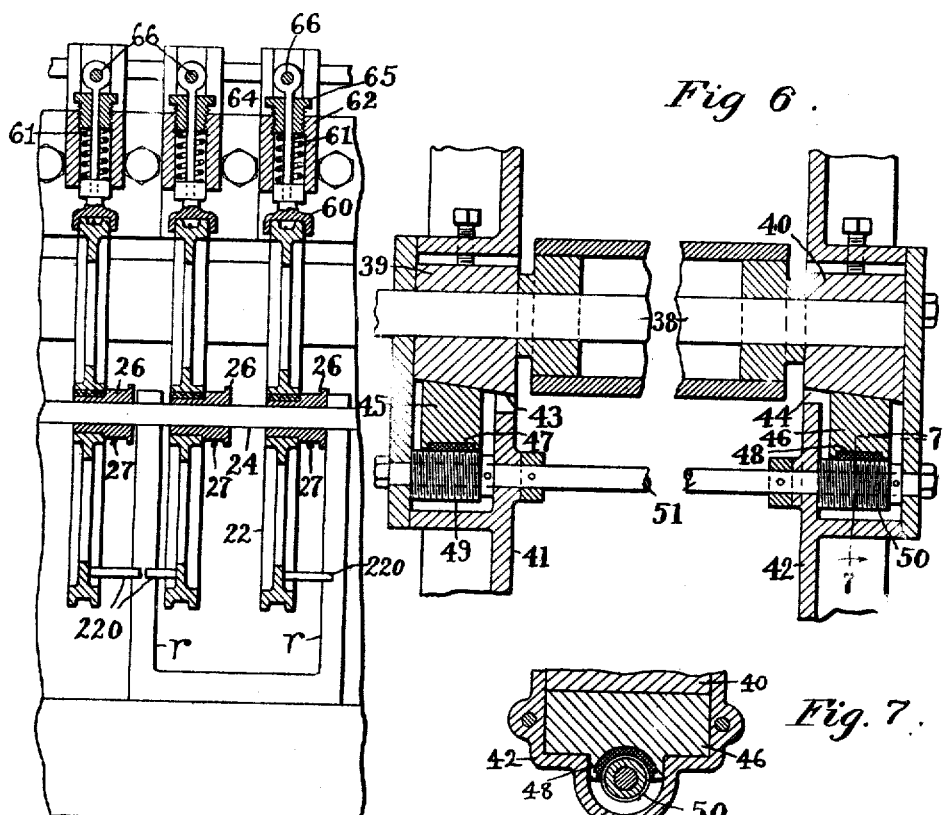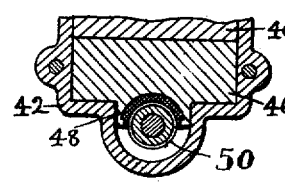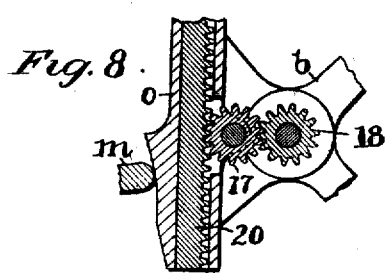

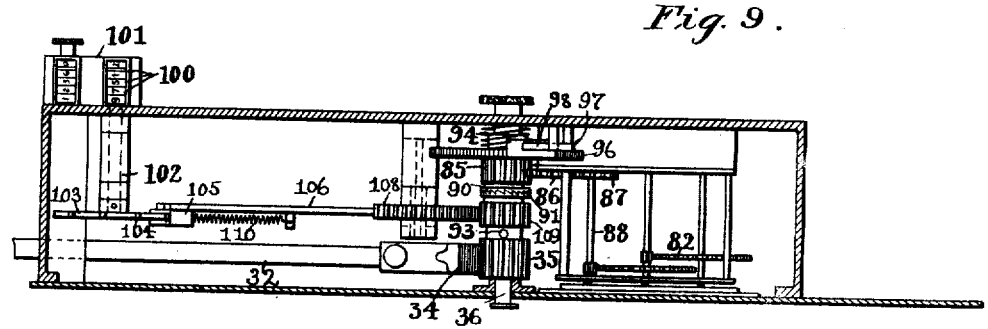
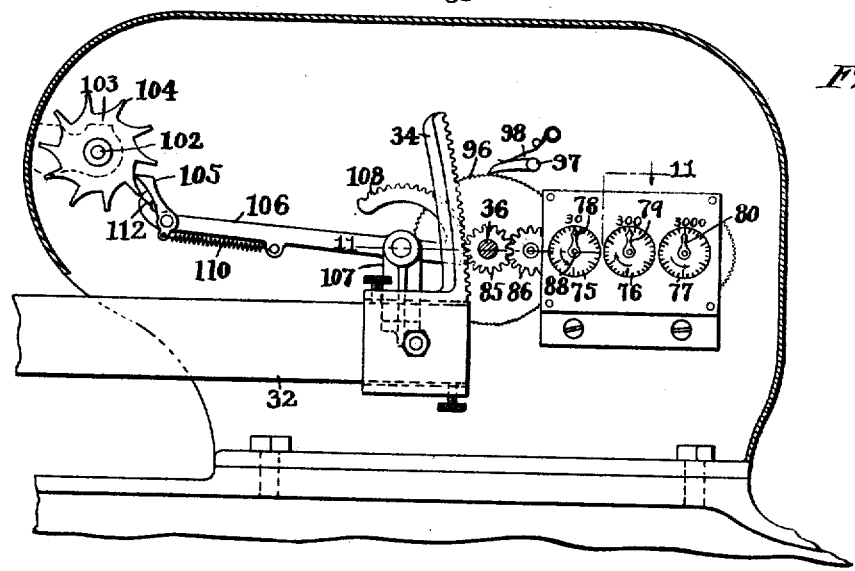
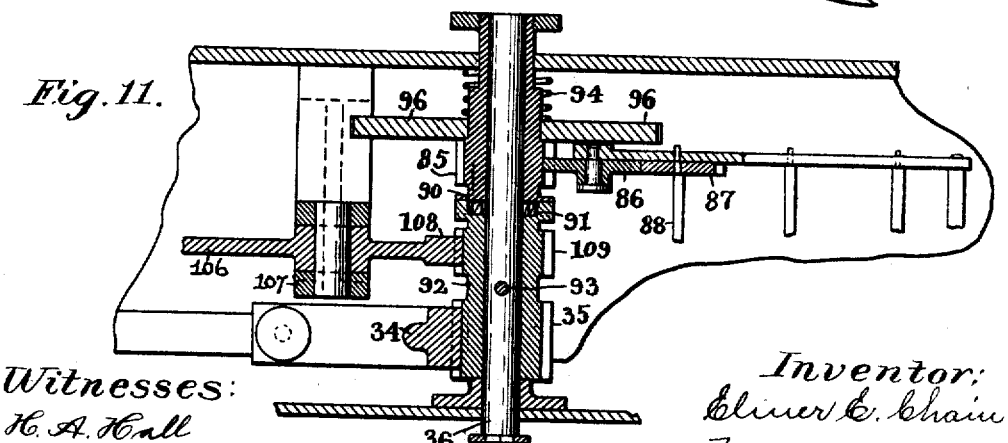

UNITED STATES PATENT OFFICE.

ELMER E. CHAIN, OF PEABODY, MASSACHUSETTS.

MEASURING-MACHINE.

No. 907,126.

Specification of Letters Patent.  Patented Dec. 22, 1908.

Application filed June 22, 1907. Serial No. 380,289.

*To all whom it may concern:*

Be it known that I, ELMER E. CHAIN, a citizen of the United States, residing in Peabody, in the county of Essex and State of Massachusetts, have invented an Improvement in Measuring-Machines, of which the following description, in connection with the accompanying drawings, is a specification, like letters on the drawings representing like parts.

This invention relates to a machine for measuring surface areas, and is especially designed and adapted among other uses to be employed for measuring the surface area of hides, skins and leather.

The invention has for one of its objects to provide a machine with which hides, skins and leather may be accurately measured.

The invention also has for its object to provide a machine with means whereby a record of the total number of skins and the total area measured may be obtained.

These and other features of this invention will be pointed out in the claims at the end of this specification.

Figure 1:
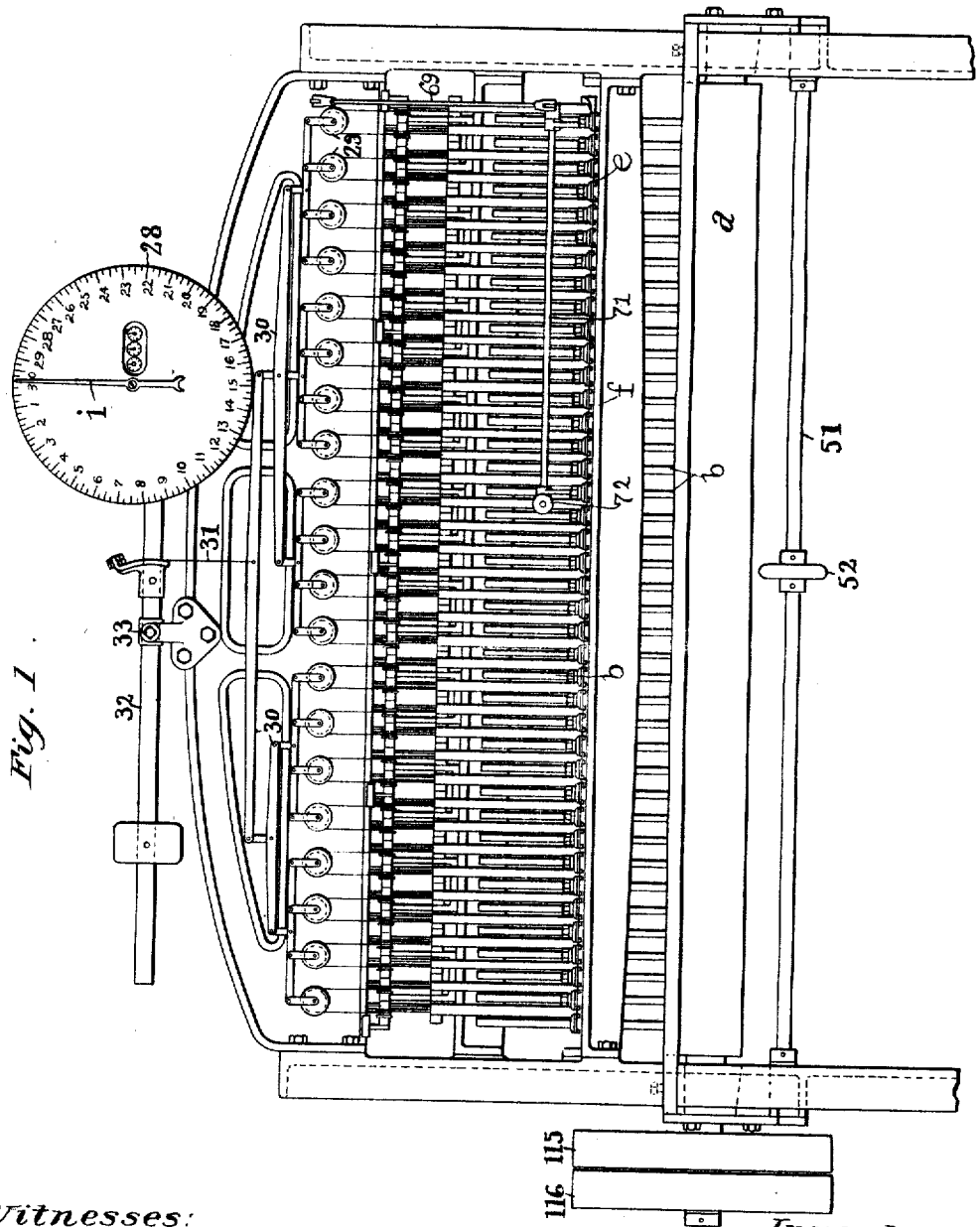
Figure 2:
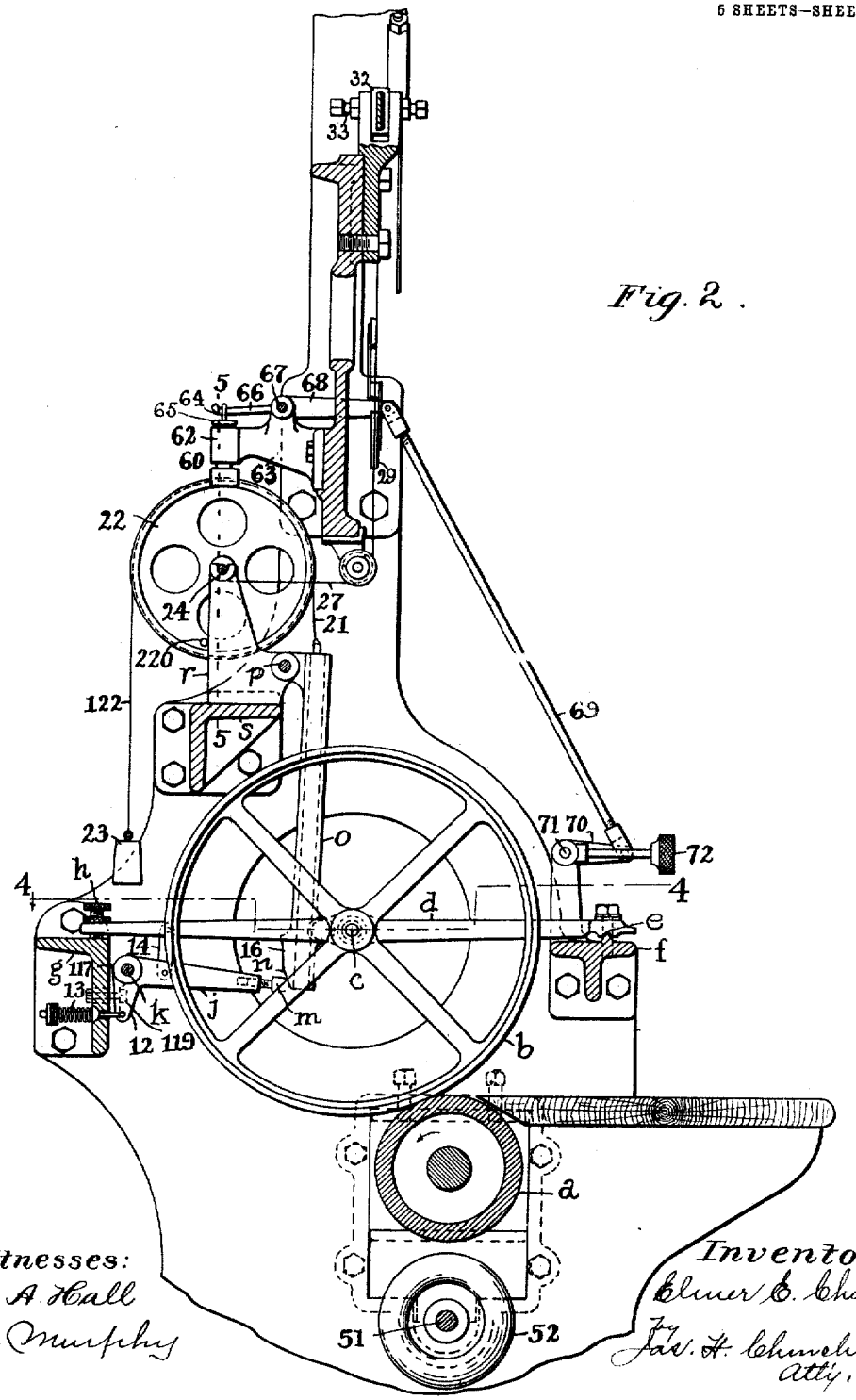
Figure 3:
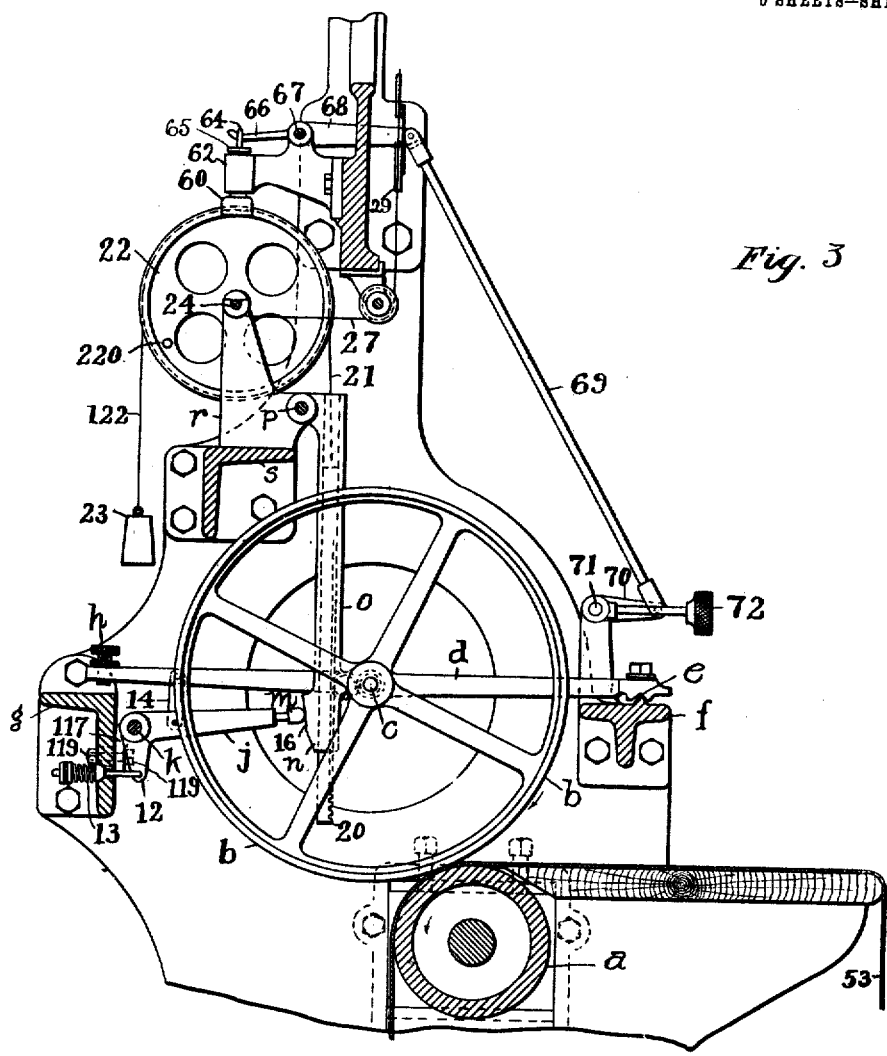

Figure 1 is a front elevation of one form of measuring machine embodying this invention. Fig. 2, a vertical section of the machine shown in Fig. 1, showing the same in its inoperative position. Fig. 3, a similar view showing the machine in its operative position. Fig. 4, a horizontal sectional detail through the measuring wheels, taken on the line 4—4, Fig. 2. Fig. 5, a vertical sectional detail on an enlarged scale on the line 5—5, Fig. 2. Figs. 6 and 7, enlarged details in section of the bed roll and its adjusting mechanism. Fig. 8, an enlarged sectional detail to be referred to. Figs. 9, 10 and 11, enlarged details in plan, elevation and section of the recording mechanisms to be referred to.

In the machine hereinshown as embodying this invention, *a* represents a bed roll with which coöperates a plurality of measuring wheels *b*, which are bodily movable toward and from the bed roll and for this purpose, each wheel *b* is mounted on a shaft *c*, carried by a lever *d*, which is pivoted at one end as on a knife edge *e* erected upon a cross bar *f* of the framework of the machine, and has its other end normally supported by a cross bar *g* of the framework, the free end of said lever being preferably provided with a set screw *h*, which coöperates with the cross bar *g* to limit the downward movement of the lever *d* and the wheel *b* carried thereby.

Provision is made for rendering the machine of increased efficiency or accuracy in its measurement, and for this purpose, the measuring wheel is caused to engage the intermediate mechanism between it and the indicating mechanism or movable pointer *i*, shown in Fig. 1, by the bodily movement of the measuring wheel away from the bed roll and before rotary movement of the measuring wheel takes place. In the present instance I have shown one means for accomplishing this end, which consists in an elbow lever *j*, pivoted at *k* and having its long arm provided with an adjustable finger or extension *m*, which coöperates with an inclined or cam surface *n* on the rear side of a hollow lever *o*, pivoted at *p* to an upright or bracket *r* erected upon a cross bar *s* of the framework. The short arm 12 of the elbow lever *j* has connected to it on end of a spring 13, which serves to keep the long arm of the said elbow lever in its lowered or normal position. The long arm of the elbow lever *j* is joined by a link 14 to the free end of the lever *d*, which carries the measuring wheel, so that when the measuring wheel is moved away from the bed roll by the interposed skin, as represented in Fig. 3, the free end of the lever *d* is elevated, which carries with it the link 14 and the long arm of the elbow lever *j* into the position shown in Fig. 3, wherein the adjustable finger *m* is shown as engaging a curved surface 16 on the lever *o* above the cam surface *n*. When the long arm of the elbow lever *j* is elevated, its adjustable finger *m* rides up the inclined or cam surface *n* and moves the lower end of the lever *o* forward or toward the shaft *c* of the measuring wheel, thereby causing a pinion 17 carried by the lever *o* (see Fig. 8) to engage a pinion 18 fast to the measuring wheel. When the adjustable finger *m* engages the curved surface 16, which occurs when the pinions 17, 18 are in mesh, the forward movement of the lever *o* ceases, although the measuring wheel *b* may continue to be moved away from the bed roll, because the curved surface 16 is made as an arc of a circle having the pivot $k$ for the elbow lever $j$ as a center.

The finger $m$ is made adjustable with relation to the cam or inclined surface $n$, so that the movement of the pinion 17 toward the pinion 18 may always be the same, irrespective of the upward or bodily movement of the measuring wheel, and as a result a constant condition is obtained between the measuring wheels and the indicating mechanism, irrespective of the movement of the measuring wheels and of the thickness of the hides or skins. The lever $j$ may also be adjustable and for this purpose, the pivot $k$ for the said lever may be attached to a block or piece 117 vertically movable and adjustably secured to the frame by a bolt 119. The pinion 17 is in mesh at all times with a rack bar 20, movable longitudinally in the lever $o$, which is made hollow and open at its opposite end and acts as a guide for the said rack bar, which has connected to its upper end a cord, chain or other flexible connection 21 fastened as herein shown to a grooved pulley or wheel 22, to which is also attached a cord 122 carrying a weight 23, which substantially counterbalances the weight of the rack bar 20. The pulley 22 may be designated the pointer actuating pulley. The wheel or pulley 22 is loosely mounted on a shaft or rod 24 (see Fig. 5) supported in the brackets $r$, and has fast to it a hub 26 to which is fastened one end of a cord, chain or other flexible connection 27, which forms part of a mechanism for transmitting rotary movement of the pulley or wheel 22 to a pointer $i$ coöperating with a dial 28 having graduations indicative of feet or other units of surface and such as now commonly employed in machines of this class, the said mechanism being best shown in Fig. 1 and comprising pulleys 29, a system of levers 30, and a flexible connection 31 joining the system of levers 30 with a main lever 32, which is pivoted t 33 to the framework of the machine. The lever 32 is provided with a rack bar 34 (see Figs. 9, 10 and 11) which engages a pinion 35 on the pointer shaft 36.

Provision is made for simultaneously adjusting the opposite ends of the bed roll $a$, which may be accomplished as hereinshown (see Figs. 1, 5 and 7) by mounting the shaft 38 of the bed roll in boxes 39, 40, which are vertically movable in the side pieces 41, 42 of the framework and are provided with inclined lower surfaces 43, 44, which extend in the same direction and are engaged by correspondingly inclined upper surfaces of movable wedge blocks 45, 46, provided on their lower surface with screw-threaded bushings 47, 48, which are engaged by screw-threaded sleeves or enlargements 49, 50 on a shaft 51 provided as shown with a hand wheel 52, which is located preferably at the center of the shaft as shown in Fig. 1.

By reference to Fig. 6, it will be seen that rotation in one direction of the shaft 51 effects bodily movement of the wedge blocks 45, 46 in one direction to raise the bed roll, and rotation of the said shaft in the opposite direction, effects bodily movement of the wedge blocks in the opposite direction to permit the bed roll to be lowered by gravity.

In operation with the machine as thus far described, the bed roll $a$ is adjusted so as to just clear the measuring wheels, and the fingers $m$ are adjusted so as to determine the extent of movement of the rack bar 20 and pinion 17, which is such that the edge of the hide or skin 53 as the latter is fed by the bed roll, will first lift the measuring wheels, their supporting levers $d$ and the elbow levers $j$, and cause the engagement of the pinions 17, 18 (see Fig. 8) before any portion of the surface of the hide or skin passes out of contact with the measuring wheels, with the result that the entire surface of the skin is effective in rotating the measuring wheels, which through the pinions 17, 18, effects movement of the rack bar 20 downward in its guide lever $o$, and through the mechanism above described, moves the pointer $i$ over the dial 28 to the graduation indicative of the surface area of the hide or skin. In this way, a more accurate measurement of the surface area of the hide or skin is obtained.

After the hide or skin has passed through the machine, the measuring wheels and the levers $d$, $j$ are returned to their starting position by the springs 13, which move the fingers $m$ downward and permit the levers $o$ to swing back so as to disengage the pinions 17 from the pinions 18 and said springs act through their connection with the levers $d$, to quickly move the measuring wheels into their lower or inoperative position.

The pointer $i$ is held in the position into which it is moved by means of friction brakes or devices which engage the wheels or pulleys 22. The friction devices or brakes referred to may be made as herein shown, (see Figs. 2, 3 and 5,) and consist of brake shoes 60, which are held in engagement with the wheels 22 by springs 61, located in hollow bosses 62 on brackets 63 attached to the framework of the machine, said springs encircling rods 64 extended through nuts or removable caps or plugs 65 for said bosses and having eyes through which are extended fingers or arms 66 on a rock shaft 67, journaled in the brackets 63 and provided with a crank 68, which is joined by a link 69 to a crank 70 on a rock shaft 71, located at the front of the machine and provided with a handle or arm 72, by means of which the operator may rock the shaft 71 so as to lift the brakes 60 and release the wheels 22, which are rotated in the reverse direction by the weight 23. The reverse movements of the wheels 22 and of the rack bar 20 may be limited by a stop, herein shown as a pin 220 on the wheel or pulley 22, which engages the bracket r. Provision is also made for indicating on the machine the total surface area measured, and also the total number of hides or skins measured, thereby saving the operator from loss of time and work in ascertaining the same. These desirable results may be obtained as will now be described.

To obtain the total of the surface areas measured, the machine is provided with a totalizer of any suitable or usual construction and herein shown as comprising three dials 75, 76, 77 (see Fig. 10) with which coöperate pointers or indexes 78, 79, 80, and which may be designated the units, tens and hundreds dials. Each of the dials 75, 76, 77 is provided with graduations corresponding in number to the graduations of the main dial 28, and the pointers 78, 79, 80 are operated by mechanism or gearing 82 (see Fig. 9), in a well-known manner, so that one complete revolution of the pointer 78, effects movement of the pointer 79 one step or graduation of its dial, and one complete revolution of the pointer 79 effects movement of the pointer 80 one step or graduation of its dial. The pointer 78 of the units dial 75 is moved in unison with the main pointer i, by mechanism, which has provision for permitting the pointer i to be moved in a reverse direction, while the pointer 78 is stationary. For this purpose, the shaft 36 to which the main pointer i is fastened, has loose on it a pinion 85 which meshes with an intermediate pinion 86, in mesh with a pinion 87 on the shaft 88 of the units pointer 78, and the said loose pinion is adapted to be rendered fast on the shaft 36 by a clutch, consisting of teeth 90 on the end of the pinion 85 which engage like teeth 91 on the end of the hub 92 of the pinion 35, which latter is rendered fast on the shaft as by the pin 93. The teeth 90 on the pinion 85 are normally held in engagement with the teeth 91 on the hub 92 by a spring 94 (see Fig. 11), which spring permits the pinion 85 to be moved longitudinally on the pointer shaft 36, when the latter is turned in the reverse direction to restore the pointer i to its starting position.

The pinion 85 has fast on it a ratchet wheel 96 with which coöperates a holding pawl 97, which is held in engagement with said ratchet wheel by a spring 98. The pawl 97 serves to hold the ratchet wheel 96 and the pinion 85 and consequently the pointer 78 from being moved backward, when the main pointer i is returned to its starting position. It will thus be seen that when a skin is put through the machine, the pointers i, 78 are moved in unison to the same extent on their respective dials, and the same number of feet are indicated on both dials, but when the pointer i is returned to its starting or zero position for measuring the next skin, the pointer 78 does not return but starts from the position in which it was left by the first skin, and if the number of feet in the second skin is more than the remaining numbers of the dial 75, the pointer 79 is moved one graduation for the complete revolution of the units pointer 78. In this manner the total number of feet of skins measured is indicated by reading the totalizer in a manner well understood. I have also shown one form of mechanism for indicating at the machine the number of skins measured thereby. To this end I have provided a counting mechanism, which is herein shown of a construction similar to a cyclometer and comprising a plurality of rotatable disks 100 (see Fig. 9) contained in a suitable casing 101 and having numbers from zero to nine, the arrangement being such that the units disks at each complete revolution moves the next or tens disks one step, etc.

The units disk of the counting mechanism is actuated step by step from the pointer shaft 36, and for this purpose the shaft 102 of the units disk is provided with a wheel or disk 103 having ten teeth or projections 104 with which coöperates a push pawl 105 pivoted to a lever 106, which is pivoted to a suitable support 107 and is provided with a curved rack bar or segmental gear 108, which meshes with a pinion 109 on the hub 92 of the pinion 35. As each skin is passed through the machine, the pinion 109 through the segmental gear 108 turns the lever 106 on its pivot so as to elevate the pawl 105 and cause it to push the toothed wheel 103 and its shaft 102 around the distance of one tooth of the wheel 103, which corresponds to the distance between adjacent numbers on the units disk of the counter 100. When the units disk of the counter 100 has been moved one step as described, the pawl 105 passes out of engagement with the tooth 104 with which it was engaged, and on the return movement of the lever 106, said pawl clicks by the next tooth of the wheel 103, after which it is brought by a spring 110 into its operative position against a stop finger 112 on the lever 106. This operation is repeated for each skin passed through the machine, and in this way, the total number of skins measured by the machine in a given time may be made known to the operator and the owner. It will thus be seen that the machine indicates to the owner or other person, not only the number of skins which have been measured, but also the total surface area of the measured skins.

It will be observed that the measuring wheels are supported independently of the bed roll, with the result that the measuring wheels not engaged by the hide or skin are idle and not driven, thereby avoiding wear on these wheels. So also it will be observed that the pointer actuating wheels 22 are held in the position into which they are moved by the hide or skin engaging the measuring wheels, and as a result, errors in measurement due to backward movement of the pointer-actuating wheels, are avoided. So also the accuracy of the machine is materially increased by providing for effecting connection between the measuring wheels and the pointer operating mechanism by a limited movement of the measuring wheels and for permitting additional movement of the measuring wheels without disturbing the relation of the measuring wheels with the pointer operating mechanism.

The bed roll $a$ may be driven in any suitable manner, and is shown as provided with fast and loose pulleys 115, 116.

Claims.

1. In a machine of the class described, in combination, a rotatable bed, measuring wheels coöperating therewith, levers carrying said measuring wheels, pinions carried by said measuring wheels, movable rack bars, pinions in mesh with said rack bars and coöperating with the pinions carried by said measuring wheels, supports for said rack bars and the pinions meshing therewith, cam surfaces on said supports, levers connected with the levers carrying the measuring wheels and coöperating with the said cam surfaces to effect engagement of said pinions, a dial, a pointer coöperating therewith, rotatable wheels or pulleys for actuating said pointer, flexible means connecting said pulleys or wheels with said rack bars, friction devices coöperating with said pulleys or wheels, mechanism connecting said pulleys or wheels with said pointer, substantially as described.

2. In a machine of the class described, in combination, a rotatable bed, measuring wheels coöperating therewith, levers carrying said measuring wheels, pinions carried by said measuring wheels, movable rack bars, pinions in mesh with said rack bars and coöperating with the pinions carried by said measuring wheels, supports for said rack bars and the pinions meshing therewith, cam surfaces on said supports, levers connected with the levers carrying the measuring wheels and coöperating with the said cam surfaces to effect engagement of said pinions, a dial, a pointer coöperating therewith, rotatable wheels or pulleys for actuating said pointer, flexible means connecting said pulleys or wheels with said rack bars, friction devices coöperating with said pulleys or wheels, mechanism connecting said pulleys or wheels with said pointer, a totalizer for indicating the total area of the surfaces measured, means for connecting said totalizer with said pointer operating mechanism, and means for permitting the pointer to be moved in a reverse direction without affecting the totalizer, substantially as described.

3. In a machine of the class described, in combination, a rotatable bed, measuring wheels coöperating therewith, levers carrying said measuring wheels, pinions carried by said measuring wheels, movable rack bars, pinions in mesh with said rack bars and coöperating with the pinions carried by said measuring wheels, supports for said rack bars and the pinions meshing therewith, cam surfaces on said supports, levers connected with the levers carrying the measuring wheels and coöperating with the said cam surfaces to effect engagement of said pinions, a dial, a pointer coöperating therewith, rotatable wheels or pulleys for actuating said pointer, flexible means connecting said pulleys or wheels with said rack bars, friction devices coöperating with said pulleys or wheels, mechanism connecting said pulleys or wheels with said pointer, means for indicating the total number of surfaces measured, means for connecting said numbering means with the pointer operating mechanism, and means for permitting the pointer operating mechanism to be moved in one direction without affecting said numbering mechanism, substantially as described.

4. In a machine of the class described, in combination, measuring wheels, an indicating device, means operated by rotary movement of said measuring wheels for actuating said indicating device, and means for connecting said measuring wheels with said actuating means, said connecting means having provision for effecting movement of the actuating means laterally with relation to the plane of movement of said measuring wheels, for the purpose specified.

5. In a machine of the class described, in combination, measuring wheels, pinions carried thereby, levers carrying said wheels, rack bars, pinions in mesh therewith and coöperating with the pinions carried by said measuring wheels, guide levers for said rack bars, cam or inclined surfaces on said guide levers, and means connected with the levers carrying the measuring wheels for engaging said cam or inclined surfaces to move said rack bars and their pinions into operative engagement with the pinions of the measuring wheel, substantially as described.

6. In a machine of the class described, in combination, measuring wheels, mechanism operated by rotary movement of said measuring wheels and normally disconnected therefrom, and means operated by bodily movement of said measuring wheels for moving the said mechanism laterally with relation to the plane of movement of said measuring wheels and into operative engagement with the same, substantially as described.

7. In a machine of the class described, in combination, measuring wheels, mechanism operated by rotary movement of said measuring wheels and normally disconnected therefrom, means operated by bodily movement of said measuring wheels for moving said mechanism laterally with relation to the plane of movement of said measuring wheels and into operative engagement with said measuring wheels, and means to permit bodily movement of the measuring wheels without effecting further lateral movement of the mechanism operated by the rotary movement of said measuring wheels, substantially as described.

8. In a machine of the class described, in combination, a pointer or index, actuating wheels or pulleys therefor, means connecting said wheels or pulleys with said pointer or index, rotatable measuring wheels, means for connecting said measuring wheels with said pointer actuating wheels, and friction devices or brakes for holding said actuating wheels in the positions into which they are moved by said measuring wheels, substantially as described.

9. In a machine of the class described, in combination, a pointer or index, actuating wheels or pulleys therefor, means connecting said wheels or pulleys with said pointer or index, rotatable measuring wheels, means for connecting said measuring wheels with said pointer actuating wheels, friction devices or brakes for holding said actuating wheels in the positions into which they are moved by said measuring wheels, and means to release said friction brakes, substantially as described.

10. In a machine of the class described, in combination, a rotatable bed, measuring wheels coöperating therewith, levers carrying said measuring wheels, pinions carried by said measuring wheels, movable rack bars, means for operatively connecting said movable rack bars with the pinions on said measuring wheels, a dial, a pointer coöperating therewith, rotatable devices, means for connecting said rotatable devices with said pointer, flexible means connecting said rotatable devices with said rack bars, and means for holding said rotatable devices in the position into which they are moved by said rack bars and for holding said rack bars in the position into which they are moved by the measuring wheels when said rack bars are disconnected from said measuring wheels, substantially as described.

11. In a machine of the class described, a dial, a pointer or index movable in opposite directions, rotatable wheels actuated by the object whose surface is being measured, means actuated by said wheels for moving said pointer in one direction, mechanism for indicating the number of surfaces measured, and means for operatively connecting said numbering mechanism with said pointer actuating mechanism to be operated thereby when said pointer actuating mechanism is moved in one direction and to permit said numbering mechanism to be unaffected when the pointer actuating mechanism is moved in the opposite direction, substantially as described.

12. The combination with a machine for measuring surface areas provided with a plurality of measuring wheels movable by the object whose surface is being measured, a dial, a pointer coöperating therewith to indicate surface areas, mechanism for rotating said pointer, a numbering mechanism to indicate the total number of objects measured, and mechanism operatively connecting said numbering mechanism with said pointer actuating mechanism to effect a single movement of the numbering mechanism for each object measured when the pointer actuating mechanism is moved in one direction and to permit said numbering mechanism to be unaffected by movement of the pointer actuating mechanism in the opposite direction.

13. In a machine of the class described, in combination, measuring wheels, an indicating device, mechanism for actuating said indicating device, and means for moving said mechanism into operative relation to said measuring wheels by bodily movement of said wheels, substantially as described.

14. In a machine of the class described, in combination, measuring wheels, an indicating device, mechanism for actuating said indicating device, means for moving said mechanism into operative relation to said measuring wheels by bodily movement of said wheels, and means for determining the extent of movement of said mechanism toward said measuring wheels, substantially as described.

15. In a machine of the class described, in combination, measuring wheels, pinions carried thereby, levers carrying said wheels, rack bars, pinions in mesh therewith and coöperating with the pinions carried by said measuring wheels, levers connected with the levers carrying the measuring wheels, and coöperating with the said rack bars to move the latter laterally, and springs engaging said rack bar actuating levers, substantially as described.

16. In a machine of the class described, in combination, measuring wheels, levers carrying said wheels, an indicating device, means for actuating said indicating device rendered operative by bodily movement of the measuring wheels in one direction, springs connected with said levers for resisting the bodily movement of said measuring wheels into their operative position and to facilitate movement of said wheels in the opposite direction into their inoperative position, and means to adjust the force of said springs.

In testimony whereof, I have signed my name to this specification in the presence of two subscribing witnesses.

ELMER E. CHAIN.

Witnesses:
JAS. H. CHURCHILL,
J. MURPHY.